No. 685,232. Patented Oct. 22, 1901.
W. M. CONWAY.
BALL BEARING WHEEL.
(Application filed July 19, 1901.)
(No Model.)
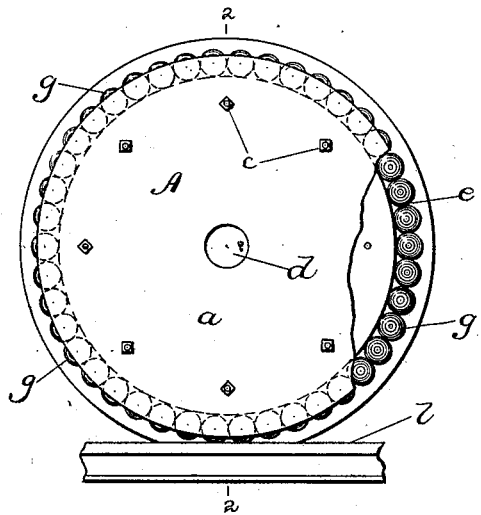
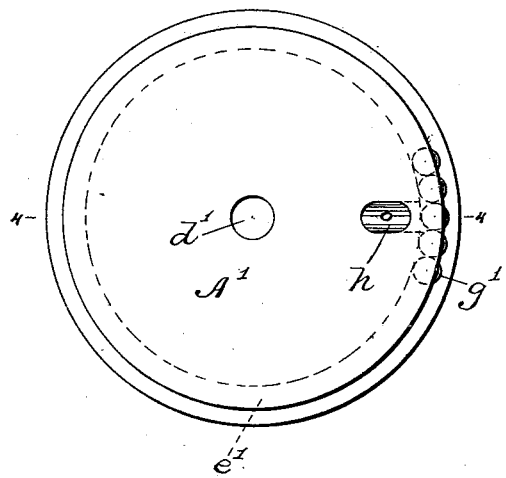
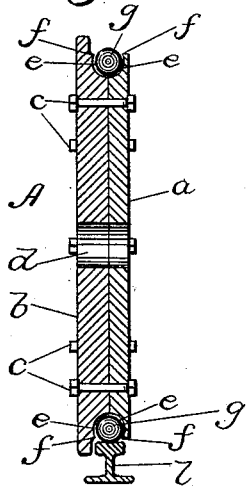
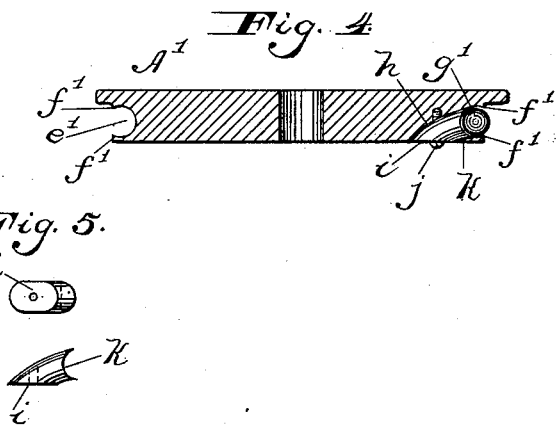
Witnesses.
H. F. Meyer, Jr.
F. S. Stitt.
Inventor.
William M. Conway
By Chas. B. Mann
Attorney.

UNITED STATES PATENT OFFICE.

WILLIAM M. CONWAY, OF BALTIMORE, MARYLAND, ASSIGNOR OF TWO-THIRDS TO J. SOUTHGATE LEMMON, CHARLES B. ROBERTS, JR., AND HOWARD CARLTON, OF BALTIMORE, MARYLAND.

BALL-BEARING WHEEL.

SPECIFICATION forming part of Letters Patent No. 685,232, dated October 22, 1901.

Application filed July 19, 1901. Serial No. 68,890. (No model.)

*To all whom it may concern:*

Be it known that I, WILLIAM M. CONWAY, a citizen of the United States, residing at Baltimore, in the State of Maryland, have invented certain new and useful Improvements in Ball-Bearing Wheels, of which the following is a specification.

The object of this invention is an improved ball-bearing wheel having a ball-bearing tread to reduce to a minimum the friction between the wheel and the surface on which it rolls.

The invention consists in certain constructions and arrangements of the parts, hereinafter fully described and claimed, reference being had to the accompanying drawings, in which—

Figure 1 is a side elevation, with part broken away, of one form of my improved ball-bearing wheel. Fig. 2 is a vertical diametrical section thereof on the line 2 2 of Fig. 1. Fig. 3 is a side elevation of a modified form of ball-bearing wheel. Fig. 4 is a diametrical section thereof on the line 4 4 of Fig. 3. Fig. 5 illustrates in detail the plug employed in connection with the modified form of ball-bearing wheel shown in Figs. 3 and 4.

Referring to the drawings, Figs. 1 and 2, the letter A designates one form of the ball-bearing wheel, which is constructed in two abutting side sections $a$ $b$, secured together by rivets or bolts $c$, as best shown in Fig. 2, and provided with a central bearing-opening $d$, by which the wheel is revolubly mounted on a shaft or the like. Each section at its circumferential edge is provided with a recess $e$, which recesses together form a circular uninterrupted or continuous channel in the tread of the wheel, and the outer edges of said channel extend inwardly slightly beyond the cross-sectional diameter of the same, whereby to form two overhanging flanges $f$. Antifriction-balls $g$ are mounted to move freely around in said channel and are retained therein by said flanges and protrude out of the channel to form the tread of the wheel.

In that form of the invention illustrated in Figs. 3, 4, and 5 the wheel A' instead of being constructed in two side sections is made integral and is provided with a central shaft-opening $d'$ and a circumferential continuous channel $e'$, having two overhanging flanges $f'$ to retain the balls $g'$ in the said channel. The said wheel A' is also provided at one side and within its circumferential edge with an opening $h$, which leads to the channel $e'$, as indicated in Figs. 3 and 4. The balls $g'$ are fed through said side opening $h$ and pass freely around the channel and fill the same, and after a sufficient number of balls are in place the said side opening $h$ is closed by a plug $i$, secured therein by means of a screw $j$, and provided with a concave end $k$, which coincides with the channel and conforms to the curvature of the same. In Figs. 3 and 4 only five balls are indicated as being passed into the channel; but it is to be understood that the channel is to be entirely filled with the balls.

In both forms of the invention illustrated in the accompanying drawings it is to be understood that the wheel itself is intended to turn about a shaft or spindle and that the balls at the tread of the wheel will also turn on a surface, such as the rail $l$, on which the wheel rolls. The friction is thereby greatly reduced.

The improved wheel hereinbefore described is intended to be used as a revoluble car-wheel or for a rolling support for door-hangers, for an elevator-wheel, or for any other purpose for which it is manifestly adapted.

Having thus described my invention, what I claim as new, and desire to secure by Letters Patent, is—

1. The herein-described wheel, provided with an opening to receive a shaft on which it is adapted to rotate, and also provided at its circumferential edge with an uninterrupted or continuous channel circular throughout having overhanging flanges; and antifriction-balls mounted to roll freely in said channel and held therein by said overhanging flanges, as and for the purpose set forth.

2. The herein-described wheel, provided with an opening to receive a shaft, and also provided at its circumferential edge with an uninterrupted or continuous channel having overhanging flanges, and said wheel also provided with a side opening leading into said channel and adapted to pass antifriction-balls into the latter; antifriction-balls mounted to roll freely in said channel and held therein by said overhanging flanges; and a plug, $i$, secured in said side opening to close the same and provided with a concave end, $k$, conforming to the curvature of said channel, as and for the purpose set forth.

In testimony whereof I affix my signature in the presence of two witnesses.

WILLIAM M. CONWAY.

Witnesses:
FREDERICK S. STITT,
CHARLES L. VIETSCH.